United States Patent [19]
Dent et al.

[11] Patent Number: 5,841,766
[45] Date of Patent: Nov. 24, 1998

[54] DIVERSITY-ORIENTED CHANNEL ALLOCATION IN A MOBILE COMMUNICATIONS SYSTEM

[75] Inventors: Paul W Dent, Stehag; Magnus Ewerbring, Stockholm, both of Sweden

[73] Assignee: Ericsson Inc., Research Triangle Park, N.C.

[21] Appl. No.: 695,729

[22] Filed: Aug. 12, 1996

Related U.S. Application Data

[63] Continuation of Ser. No. 354,904, Dec. 12, 1994, abandoned.

[51] Int. Cl.$^6$ .................................................. H04B 7/212
[52] U.S. Cl. ............................................ 370/321; 370/375
[58] Field of Search ...................................... 375/202, 211, 375/260, 267, 347, 354, 356; 379/60; 455/33.2, 33.4, 52.1, 52.2, 52.3, 101, 103, 296, 303; 342/352, 353, 354, 372; 370/310, 315, 316, 317, 321, 324, 325, 326, 328, 331, 336, 337, 345, 347, 350

[56] References Cited

U.S. PATENT DOCUMENTS

| | | | |
|---|---|---|---|
| 4,888,769 | 12/1989 | Deal | 370/95.3 X |
| 4,901,307 | 2/1990 | Gilhousen et al. | 370/18 |
| 4,942,570 | 7/1990 | Kotziu et al. | 370/263 |
| 5,048,059 | 9/1991 | Dent | 375/94 |
| 5,099,499 | 3/1992 | Hammar | 375/94 |
| 5,151,919 | 9/1992 | Dent | 375/1 |
| 5,241,702 | 8/1993 | Dent | 455/278.1 |
| 5,331,666 | 7/1994 | Dent | 375/94 |
| 5,335,250 | 8/1994 | Dent et al. | 375/10 |
| 5,390,166 | 2/1995 | Rohani et al. | 370/18 |
| 5,402,424 | 3/1995 | Kou | 370/95.3 |
| 5,432,778 | 7/1995 | Minde et al. | 370/95.3 |

FOREIGN PATENT DOCUMENTS

| | | | |
|---|---|---|---|
| 0 536 068 | 10/1992 | European Pat. Off. | H04B 7/195 |
| 88/04837 | 6/1988 | WIPO | H01Q 3/22 |
| 89/06883 | 7/1989 | WIPO | H04B 7/26 |

OTHER PUBLICATIONS

"An Optimal Time Slot Assignment Algorithm in SS/TDMA System With Intersatellite Link", El–Soudani M et al., 13 EME Colloque Sur Le Traitement Du Signal Et Des Imags, Juan Les Pins, Sep. 16–20, 1991, Gretsi, pp. 445–448.

"Time Slot Assignment in SS/TDMA Systems with Intersatellite Links", A. Bertossi et al., IEEE Transactions on Communications, vol. COM–35, No. 6. Jun. 1987, pp. 602–608.

"Synchronization and Routing Aspects in a Cluster of Satellites with On–Board Processing", S. Bellaccini et al., IEEE Global Telecommunications Conference, vol. 3, 1–4 Dec. 1986, pp. 1713–1719.

"Crosslink Architectures for a Multiple Satellite System", R. Binder et al., Proceedings of IEEE, vol. 75, No.1, Jan. 1987, pp. 74–82.

"The Networking of Dynamic Satellite Constellations", C. Cullen et al., European Conference on Satellite Communications, 2–4 Nov. 1993, Manchester, UK, pp. 325–329.

"Inter–Satellite Links for Personal Communications Low Earth Orbit Satellite Systems", P. Jung et al., 3rd European Conference on Satellite Communications, 2–4 Nov. 1993, Manchester, UK, pp. 246–250.

*Primary Examiner*—Hassan Kizou
*Assistant Examiner*—Abdeliamid Bnimoussa
*Attorney, Agent, or Firm*—Burns, Doane, Swecker & Mathis, L.L.P.

[57] ABSTRACT

A method and apparatus for communicating with a plurality of ground terminals using a plurality of satellites transmitting time-division multiplexed signals are disclosed. First, a first satellite transmits to a first group of ground terminals using a first number of timeslots in a TDM frame period. In addition, the first satellite and a second satellite transmit in alternate TDM frames to a second group of ground terminals using a second number of timeslots in said TDM frame period. Finally, the second satellite transmit to a third group of ground terminals using a third number of timeslots in the TDM frame period.

27 Claims, 9 Drawing Sheets

DIVERSITY-ORIENTED CHANNEL ALLOCATION IN A MOBILE COMMUNICATIONS SYSTEM

This application is a continuation of application Ser. No. 08/354,904, filed Dec. 12, 1994, now abandoned.

FIELD OF THE INVENTION

The present invention relates to satellite communications, and more particularly to a method of communicating with a plurality of ground terminals using a plurality of satellites which transmit time division multiplexed signals.

BACKGROUND OF THE DISCLOSURE

Satellite communication with handportable terminals can be interrupted by signal shadowing due to buildings, trees, etc. With non-equatorial, non-geostationary satellite orbits it is possible to give a portable terminal a choice of more than one satellite, each satellite having a different position in the sky, in an effort to avoid problems caused by shadowing.

For non-geostationary satellites, the signal frequency suffers from considerable Doppler shift. Consequently, the signals in each direction must have their frequencies "precompensated", i.e., shifted by the negative of the expected Doppler shift, so that the signals arrive at their respective receivers in their assigned channels so that they do not stray into neighboring channels.

In a TDMA land based system, the base stations are static so that Doppler shift is not a problem. However, the distances between a handportable terminal and a satellite are much larger than for a land-based system, so that a time synchronising problem arises instead. As a result, uplink transmissions from handportable terminals must be adjusted in time according to the expected propagation delay to ensure that the signals arrive at the satellite in their assigned TDMA timeslots rather than straying into neighboring timeslots.

One problem with using satellite diversity to escape the problems caused by shadowing is that the precompensation needed for either time or frequency cannot be made correctly for two different satellites that either have different positions or relative velocities, unless the handportable terminals in question are restricted to be all close to each other. In that event, any satellite experiences the same Doppler shift for all their signals, so that the signals do not overlap in frequency. In addition, any satellite experiencing the same propagation delay from all nearby handportable terminals remains in relatively correct timing relationships in a TDMA system.

For example, if a mobile station A is 11000 km away from a satellite 1 and a mobile station B is 11300 km away, then the mobile B shall advance its transmission by 2 ms relative to signals received from the satellite in order to compensate for the 300+300 km extra loop propagation delay.

However, the mobile A may be 11300 km away from a second satellite 2, while mobile B is 11000 km away from the second satellite. In this case, the mobile A must advance its transmission by 2 ms to ensure synchronism with mobile B as seen from the second satellite. Clearly, it is not possible to ensure synchronism at two different satellites unless the mobiles are almost co-located, or lying along the contour of equal delta-distance from both satellites.

With regard to Doppler shift, suppose the satellite 1 is moving away from the mobile A and towards the mobile B. The mobile A experiences a −1 KHz Doppler shift of received signals while the mobile B experiences +1 KHz, for example. This can be precompensated by the first satellite 1 by increasing the frequency sent to the mobile A by 1 KHz and decreasing the frequency sent to mobile B by 1 KHz. The mobile A must also increase its transmit frequency by 1 KHz and the mobile B must reduce its transmit frequency by 1 KHz so that they arrive back at the satellite with the correct relative frequency spacing to avoid interference. However, the second satellite 2 may be travelling in the opposite direction, that is toward mobile A and away from mobile B. The second satellite can also precompensate its transmitted frequencies such that they are received correctly at both mobiles. However, the mobiles must correct their frequencies in the reverse direction for the second satellite compared to the first satellite. Thus, it is clearly impossible for two mobiles that are widely separated to precompensate their transmitted frequencies such that they will be received correctly at both satellites, unless the mobiles are colocated or lie along a line of constant delta-Doppler to the two satellites.

SUMMARY OF THE DISCLOSURE

It is an object of the present invention to provide a method to ensure that mobile stations using adjacent frequencies in an FDMA system are also adjacent in position. Alternatively, it is another object of the present invention to provide a method to ensure that mobile stations using adjacent timeslots on a TDMA carrier frequency are adjacent in position. This arrangement is possible in some embodiment at least within the limitations of mapping the one dimensional time or frequency axis to the two dimensional surface of the earth served by the satellites. In another embodiment of the present invention, the two-dimensional time-frequency plane is mapped to the two-dimensional traffic service area.

According to one embodiment of the present invention, a method for communicating with a plurality of ground terminals using a plurality of satellites transmitting time-division multiplexed signals is disclosed. First, a first satellite transmits to a first group of ground terminals using a first number of timeslots in a TDM frame period. In addition, the first satellite and a second satellite transmit in alternate TDM frames to a second group of ground terminals using a second number of timeslots in said TDM frame period. Finally, the second satellite transmit to a third group of ground terminals using a third number of timeslots in the TDM frame period.

According to another embodiment of the present invention, ground terminal means adapted for communicating via a plurality of orbiting satellites is disclosed. The ground terminal means comprises receiver means for receiving a signal transmitted in a TDM timeslot from a satellite and amplifying, filtering and converting it into numerical form for processing. Timing means are also provided for adapting the receiver means to receive the TDM timeslot cyclically from each of the plurality of satellites according to a predetermined pattern. In addition, numerical processing means are provided for processing the converted signals received from different satellites in such a way as to reduce the effects of signal fading.

According to one aspect of the present invention, TDMA timeslots are distributed to mobiles along the lines of constant delta-range to the two satellites while frequencies are distributed to mobiles lying along the lines of constant delta-Doppler, thus solving some of the problems cited above.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION OF THE DISCLOSURE

Figure 1:
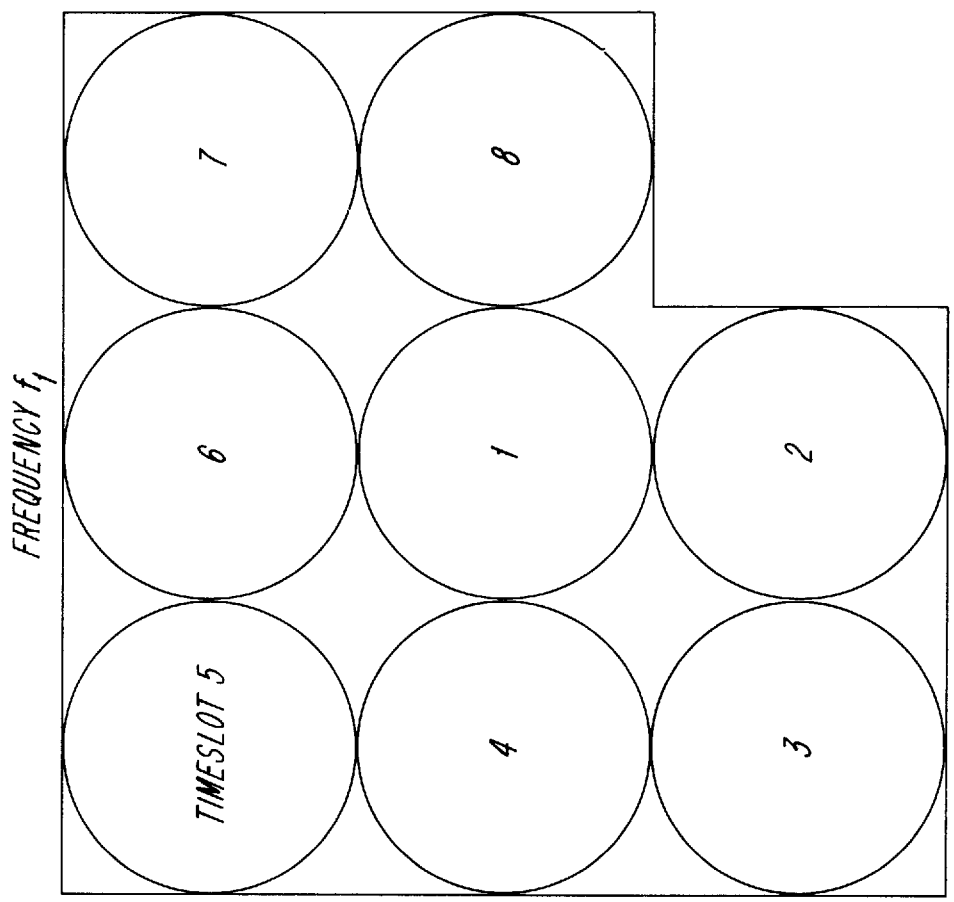
FIG. 1 illustrates a scan pattern of satellite receive beams on one carrier to minimize Delta-timing errors.

U.S. patent application Ser. No. 08/179,953 describes ground based cellular systems and satellite communications systems that facilitate re-use of the same spectrum in adjacent cells by spatially staggering, for different channels, the illumination of the service area provided by the base station/satellite antenna radiation patterns. In the satellite case, a typical antenna pattern can have a diameter of 1000 kM and a −4 dB gain change from the beam center to the edge of the beam. If two portable stations using channels 1 and 2 respectively could lie anywhere in this 1000 kM circle, there is potentially a +/−3.3 mS difference in propagation delay from the portable stations to a satellite with a low elevation angle near the horizon, as well as different Doppler shifts which are at their greatest when the satellite is overhead. If enough guard time or frequency guard space between channels 1 and 2 is provided to avoid overlap in time or frequency at two or more different satellites, the communication system would suffer from inefficient use of the available spectrum. According to the invention described in the aforementioned U.S. Patent Application, channels 1 and 2 are not used arbitrarily anywhere within an antenna beam's −4 dB contour. Assuming for this example that 100 channels are available to be distributed, channel 1 usage is restricted to, for example, the extreme North Western 1% of the 1000 kM circle, channel 2 to the adjacent 1% area immediately to the east of the area of the first channel, channel 3 to the east of that and so on in a 10×10 grid ending with channel 100 being used in the South Eastern 1% of the area. Each 1% area is approximately a 100 kM circle. Thus, the position difference between portable stations using adjacent channels is reduced by a factor of ten, with commensurate reduction of the necessary time or frequency guard bands necessary to prevent overlap of adjacent channel signals at two or more different satellites.

Consider now an example of a mixed TDMA/FDMA system having 8 timeslots on each of 80 carrier frequencies. The use of the total 640 channels within each area of size approximately equal to the antenna beam's −4.5 dB footprint is described below in conjunction with FIG. 1, which shows the spatial distribution of the eight timeslots of a single carrier. This distribution deliberately places adjacent timeslots in adjacent positions, so that the differential delay from two portable stations using adjacent timeslots to two or more satellites is minimized. As a result, the guardtime needed between bursts in order to prevent interfering overlap is minimized.

The pattern illustrated in FIG. 1 is obtained by electronically resteering the beam center for each timeslot. This is preferably accomplished by ground processing of signals relayed by the satellite's multi-element antenna, as described in the above-cited application.

The shape of the pattern does not need to be strictly adhered to. For example, timeslot 1 can be equally employed in the bottom left hand corner position if that is where a portable station exists, and there is much latitude to move the microcell positions depending on how much guard time is provided and depending on whether satellite receive diversity is in use, and on the relative positions of the satellites. When the satellites are not on opposite horizons, the relative delay is less and as a result more freedom to move the microcells exists. It is also always possible to move the microcells perpendicularly to the plane containing the two satellites, that is along a hyperbola of constant relative delay between the two satellites, while adjusting the portable station's transmitter timing, if necessary, to maintain the correct relative delay with respect to other transmitters.

Figure 2:
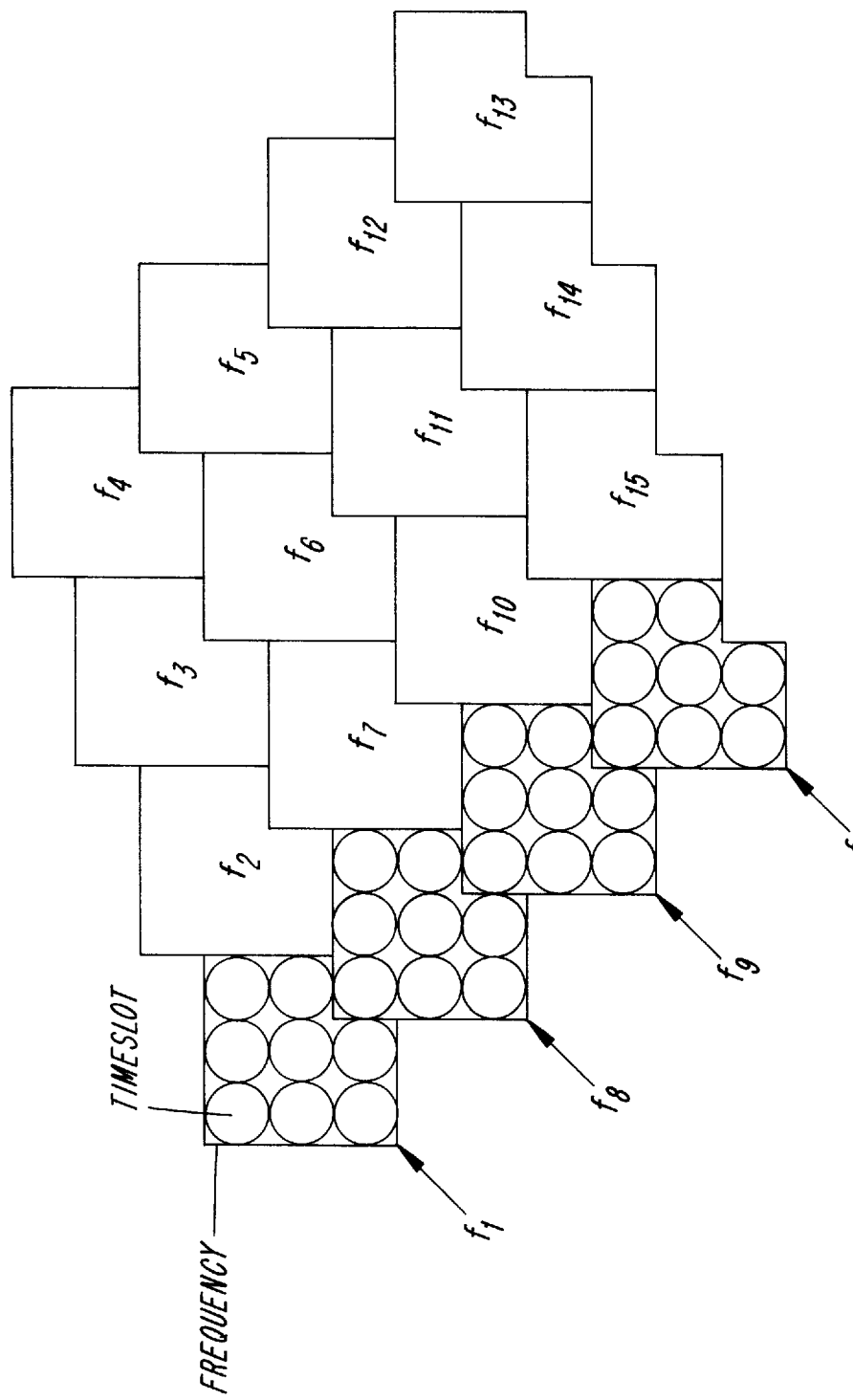
FIG. 2 illustrates the disposition of groups of 8 timeslots on each of 16 uplink carrier frequencies to minimize Delta-Doppler errors.

FIG. 2 illustrates how the groups of 8 timeslots on 16 different carriers can be formed into a 4×4 pattern using the 16 frequencies. This can be done such that adjacent frequencies are used in adjacent groups, thus minimizing the sensitivity to relative Doppler errors which are at their worst when a satellite is nominally overhead.

Figure 3:
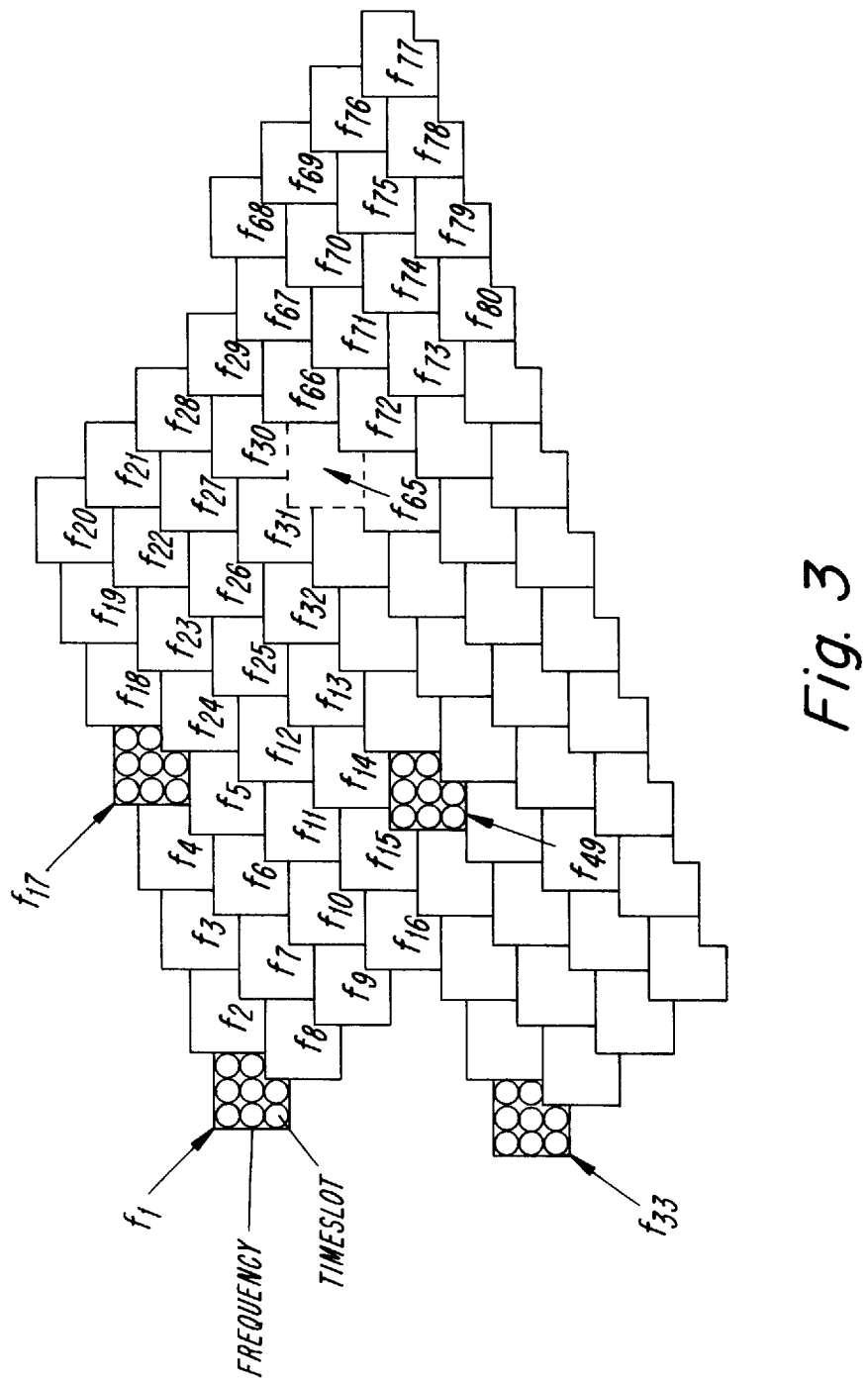
FIG. 3 illustrates the disposition of 5 groups of 16 uplink frequencies each having 8 timeslots.

On a still larger scale, FIG. 3 illustrates the disposition of 5 such groups of 8 timeslots ×16 carrier frequencies to form a 640-cell pattern. The groups using frequencies 1, 17, 33, 49 and 65 have been highlighted to show the 5-group distribution. The total 640-cell distribution is now on the order of the satellite antenna beam's nominal −4.5 dB contour. Finally, a number of abutting areas similar to FIG. 3 are created through use of the satellite multi-beam antennas capability to re-use the entire 640 channels of timeslot/frequency combinations with a spatial separation equal to the antenna pattern contour's −4.5 dB diameter (the footprint size). Typically such a satellite will have antenna means to create a number of footprints such as 19, 37, 61, 91 or 127, which represents the number of footprints that can be formed into hexagonal patterns. If the number of footprints equals 37, for example, the total channel capacity provided by the above method would be 37×640 channels.

It is shown in the above-cited application that arranging the beam footprints to touch at their −4.5 dB contours provides together with the inventive signal processing the highest antenna gain in the worst case scenario while giving good discrimination against co-channel interference from adjacent beams. When the patterns of the type illustrated in FIG. 3 from neighboring footprints are joined, it may be seen that frequencies f1,f17,f33,f49,f65 form a 5-cell re-use pattern. With certain re-use patterns employing a number of cells equal to $i^2+ij+j^2$ where i and j are integers, co-channel interferers are all equidistant from each other and the rings of 6 equidistant co-channel interferers form the vertices of a hexagon.

Figure 5:
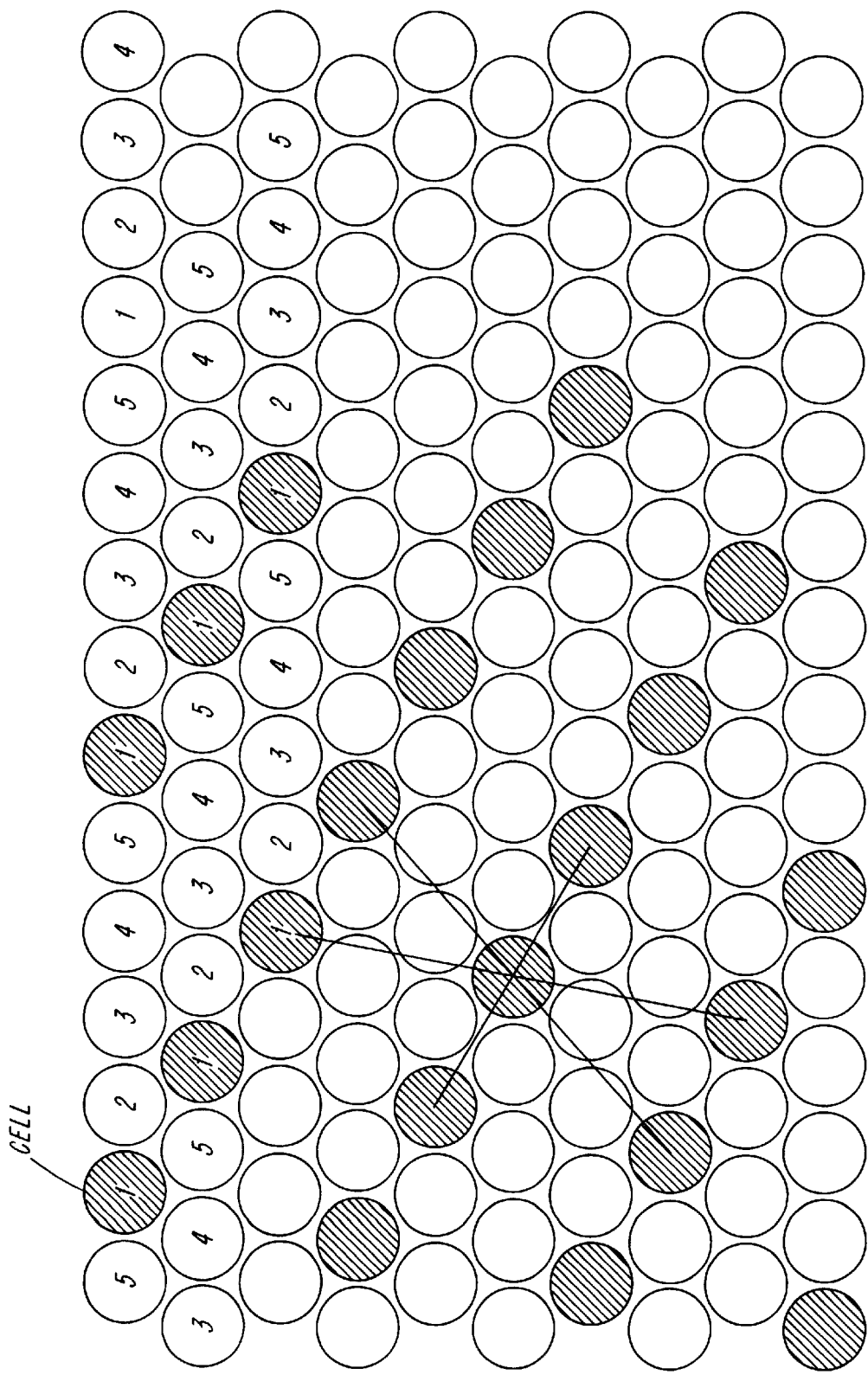
FIG. 5 illustrates a five cell reuse pattern according to one embodiment of the present invention.

A 5-cell pattern is not in the above number series, and instead has co-channel interferers located on an ellipse, as shown in FIG. 5. FIG. 5 illustrates the re-use of five frequencies indicated by the numerals 1 to 5 in different cells or beams. The cells using frequency 1 are shaded to highlight the pattern of same frequency usage. It is seen that the hexagon pattern is slightly flattened to an oval form in the case of 5-cell patterns. This is not a serious drawback since the total interference is in any case the sum of at least the 6 closest interferers, and if some interferers are closer than others, the interference sum will be similar to that if all of the interferers lay at a mean radius. However, higher order re-use patterns may be formed by combining two such elliptical re-use patterns with their major and minor axes at right angles to obtain a pattern with more uniform spacing. Thus, a 5×5 cell pattern (a 25-cell pattern) falls once more in the number series giving equidistant interferers.

It may be noted that the cell spacing illustrated in FIG. 3 is already inhomogeneous with a minor axis running from top left to bottom right and a major axis running from top right to bottom left. Thus, it is possible to arrange the ellipticity of the 5-cell re-use pattern perpendicular to this ellipticity in order to obtain a nearly uniform co-channel interferer spacing. Since 641 and 643 cell patterns fall in the series described by $i^2+ij+j^2$, and 640 is very close to these ideal numbers, an almost uniform re-use spacing is for all intents and purposes achievable with 640 channels to distribute.

Figure 4:
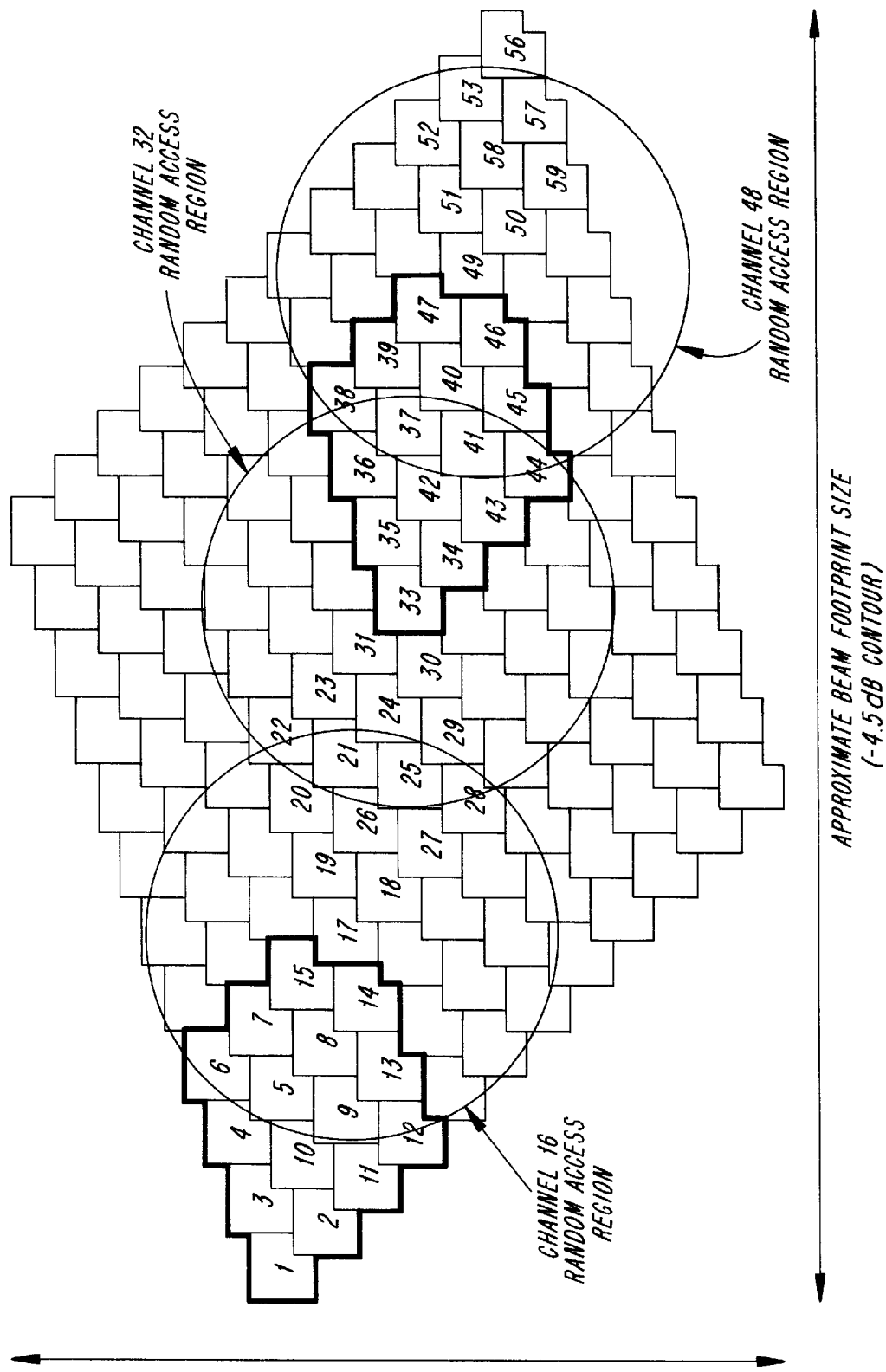
FIG. 4 illustrates another beam pattern according to one embodiment of the present invention.

FIG. 4 illustrates a modified cell pattern using only 15 out of every 16 uplink carriers. All 8 timeslots on every 16th carrier on the uplink correspond to every 16th out of 128 timeslots on each of 5 carriers on the downlink. The latter timeslots are the paging slots, which are used for network calls to portable stations. The former timeslots become the corresponding random access channels for portable station initiated calls or for responding to network calls. The random access channels are not specifically included in the pattern, and can be used on a less planned grid since call set-up communications take place on a contention basis in any case. The approximate areas within which the various random access frequencies would appropriately be used are indicated in FIG. 4. Their use in the vicinity of neighboring frequencies minimizes relative Doppler errors. The 8 timeslots per 128 timeslots used as paging channels on the downlink correspond to the eight timeslots illustrated in FIG. 1 on the uplink. The energy directed during the paging slot does not necessarily have to conform to the same pattern, since different delta-timing considerations apply for downlink diversity as will be discussed later.

The five downlink carriers that each carry a 128-timeslot wideband TDMA correspond to the five uplink frequency groups illustrated in FIG. 3, or to five groups of the 15 carriers illustrated in FIG. 4. The five downlink carriers are thus disposed in a corresponding 5-cell re-use pattern as described for the uplink By the above means, adjacent timeslots on the same uplink carrier frequency, such as timeslot 5 and timeslot 6 in FIG. 1, are spatially separated by a distance equal to the whole beam footprint diameter divided by the square root of 640. This is achieved by, at call set-up, allocating a frequency/timeslot combination for communicating with the portable station in dependence on its geographical position, i.e., allocating the portable station the frequency/timeslot closest to which it lies according to the usage pattern illustrated in FIG. 4. There is no limit as to how close together different frequency/timeslot combinations can be used, the objective being to ensure that adjacent timeslots in time on the same carrier frequency are not used so far apart spatially that propagation time differences would cause difficulties for synchronization. Thus no upper limit on call density in a particular subarea is imposed.

By using the above method, non-overlapping timeslots can be achieved at all visible satellites simultaneously provided that portable stations synchronize their transmissions in different timeslots for reception at a satellite imagined to lie vertically above one of the FIG. 1 type areas. Then when a satellite actually lies on the eastern horizon, timeslot 5 will be received delayed by approximately 40 kM (133 uS) relative to timeslot 6 and thus a 133 uS guard band between timeslots 5 and 6 will avoid overlap. Likewise, when a satellite lies on the western horizon, timeslot 8 will be received delayed by 133 uS relative to timeslot 1 to the left of it, thus the 133 uS guard time between timeslot 8 and the recurrence of timeslot 1 will in that case also prevent overlap. Timeslots 7 and 8 are projected spatially to the North and South of each other, so the guard time in that case protects against overlap when a satellite lies on the southern horizon.

If there is a bias in the directions in which a satellite can lie, for example, if equatorial satellites are used that are only seen to the south from northerly latitudes, then of course the spatial layout of timeslots can be differently optimized. In this case, a linear North-South distribution of timeslots would minimize propagation delay differences to satellites lying mainly in a southerly direction. It is also possible to distribute timeslots along the hyperbolae of constant differential time-delay to two satellites, and to distribute carrier frequency usage along orthogonal lines. Thus, an 8-timeslot system in which a 20 mS frame on each of 80 frequencies is divided into 2.5 mS timeslots can allow portable stations to transmit for 2.366 mS out of the 2.5 mS slot, the remainder of the time being reserved for guard time. It might be advantageous to slightly increase the guard time so that the timeslot distribution could allow mobiles up to 80 kM apart to use adjacent timeslots on the same carrier, in order to allow that carrier to supplement capacity in an adjacent area served primarily by 8 timeslots on another carrier. Furthermore, it is permissible for the guard time to be combined with power up- or down-ramping for spectral control purposes, as it is of little consequence if time overlap occurs with the up- or down-ramping part of the TDMA burst, since this section of the burst carries no information.

The above technique allows all portable transmissions to be received in a non-overlapping fashion by all visible satellites. The signals are relayed by the satellites to one or more ground stations, and at each ground station the same portable signal as relayed by two or more satellites can be combined using any suitable diversity combining technique such as selection diversity or optimum-ratio combining. A gain of 3 dB is obtainable when two satellites receive the same signal of equal quality and relay it. When the signal is fading in an uncorrelated fashion at the two satellites, a gain exceeding 3 dB's may be obtained by the technique.

Figure 11:
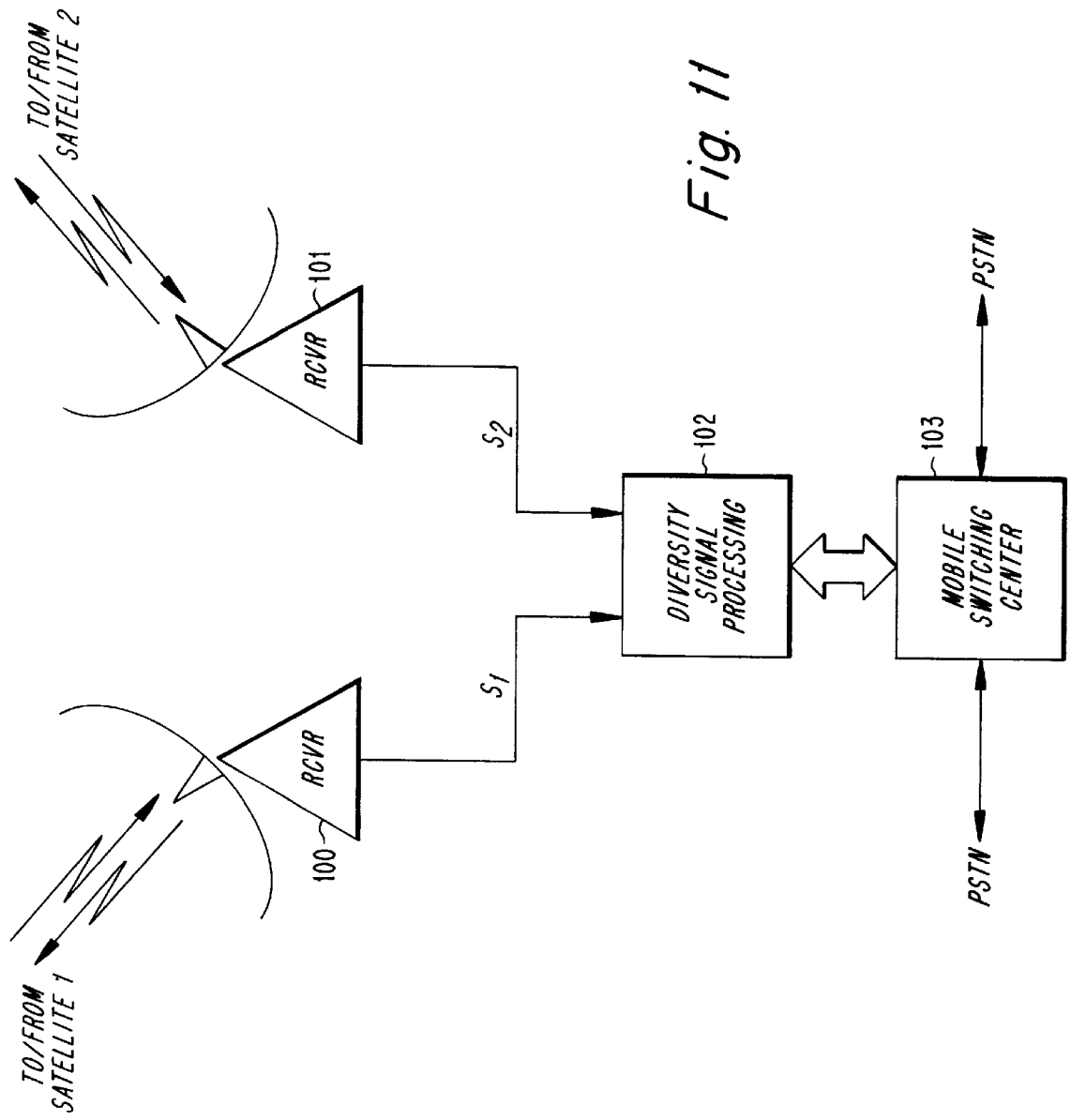
FIG. 11 illustrates a ground station for satellite diversity according to one embodiment of the present invention.

FIG. 11 shows a ground station in communication with at least two satellites for the purposes of obtaining the 3 dB diversity advantage. Two ground stations receivers 100 and 101 comprise steerable dish antennas, low noise amplifiers and feederlink downconvertors to produce composite signals S1 and S2 which are fed into a diversity processor 102. Each composite signal S1 and S2 represents the sum of many mobile transmissions using different frequencies and timeslots as received by every beam or element of the satellite's antenna arrays. The representation may consist of an analog time division multiplex of the signals received by each antenna element, as described in U.S. patent application Nos. 08/179,953, 08/225,389, and 08/225,399, all of which are incorporated herein by reference. Consequently, diversity signal processing unit 102 can comprise an arrangement for demultiplexing analog TDM streams, analog to digital conversion of separate TDM samples and digital array processing to form effective receive beams that discriminate signals received at the satellites from different directions or locations on the earth. The diversity processing then proceeds to combine signals received at the two satellites from the same location on the earth, i.e., from the same mobile unit, as identified by its frequency and timeslot allocation as well as its direction of arrival. The direction of arrival (DOA) is used to discriminate mobiles employing the same frequency and timeslot according to the reuse patterns discussed above.

A diversity combiner for each mobile signal can take on a variety of forms. A first form called a coherent combiner estimates the phase and amplitude of a TDMA burst received from a mobile separately for each satellite path, by correlating with a known symbol pattern (syncword) contained in the transmission. The syncword may be disposed in the middle of the TDMA burst. Corresponding samples received via the two satellites may then be combined with the correct phase shift and amplitude weighting to give optimum demodulated signal quality according to known prior art, starting with signal samples close to the syncwords. Samples are then combined, demodulated and decoded moving outwards from the syncwords while updating the estimate of the signals' amplitude and phase to maintain optimum combining even when amplitude and phase drift over the bursts occurs. Ideally, coded data is interleaved by placing alternate coded bits in two adjacent bursts and also alternating to the left and the right of the syncword. This permits the advantageous technique of simultaneous demodulation and decoding to be employed as described in U.S. patent application Ser. No. 08/305,787, which is incorporated herein by reference.

Alternatively, the signals received via each satellite can be separately demodulated using for example a channel-tracking equalizer. More details of suitable demodulators may be found in U.S. patent application Ser. No. 08/218, 236, U.S. Pat. Nos. 5,335,250 and 5,331,666, and Swedish Patent No. 465,697, corresponding to U.S. Pat. No. 5,099, 499, all of which are incorporated herein by reference. Together these prior disclosures teach demodulation of digitally modulated radio signals received through time varying radio channels with production of so-called "soft" decisions indicating the degree of"one-ness" or "noughtness" of a data bit instead of a hard 1/0 decision. Soft decisions are preferred when they are to be diversity combined by addition to produce combined soft decisions which are then processed in an error correction decoder. This form of diversity combinations may be called "post-detection" combinations.

Yet another form of diversity combining is to demodulate and error-correction decode the signal received from each satellite separately. The output of the decoder consists of blocks of data bits representing a speech waveform over a speech coding frame period such as 20 ms. A speech decoder then further processes the decoded block to reproduce the speech waveform. The error correction coder may include error detection means to indicate if a speech frame is correctly decoded as received from one satellite and not as received from the other, then the correctly decoded data block is selected to be passed to the speech decoder. This form of diversity combination may be called "post-decoder selection". All such forms of diversity combinations are suitable candidates for the implementation of the current invention.

Diversity signal processing unit 102 shall perform the beamforming, demodulation, decoding, diversity combining and speech decoding tasks for all mobile signals of which there can be perhaps 10000 simultaneously active. One third of these may be received only via satellite 1 and one third only via satellite 2 and thus do not need the diversity combining step. Another third however may be received with good signal strength via both satellites and thus benefit from the diversity combining step. The diversity signal processing unit continually monitors how well each signal is received via each satellite and informs the mobile switching center (MSC) 103, which also routes decoded speech to and from the public switched network (PSTN). The MSC 103 may dynamically re-allocate a mobile to use either the first, last, or middle portion of the TDMA frame according to how well it is received by the different satellites. Simultaneously, transmission to the mobile is routed via satellite 1, satellite 2, or alternately through each.

The above description applies to satellite diversity on the uplink. Satellite diversity on the downlink may be achieved using a variation of this technique.

According to the present invention, downlink diversity is provided only for a second group of portable stations that can communicate with at least two satellites approximately equally well. A first group of portable stations that can only communicate with a first satellite with a good signal-to-noise ratio is served only by the first satellite. Meanwhile, a third group of portable stations that can only communicate with the second satellite with a good signal-to-noise ratio is served only by the second satellite. These three groups use downlink channels which are divided into three corresponding groups. For example, in a pure TDMA system with 512 timeslots per frame, a first number of timeslots located at the beginning of the TDMA frame is used by the first satellite to transmit to the first group of portable stations. A third group of timeslots at the end of the frame is used by the second satellite to transmit to the third group of portable stations. Meanwhile, a second number of timeslots located in between the first and third groups of timeslots is used alternately to transmit on even numbered frames, for example, from the first satellite to the second group of portables, by forward extension of said first group of timeslots, and by said second satellite on odd frames by backward extension of said third group of timeslots. The transmissions may thus appear as follows:

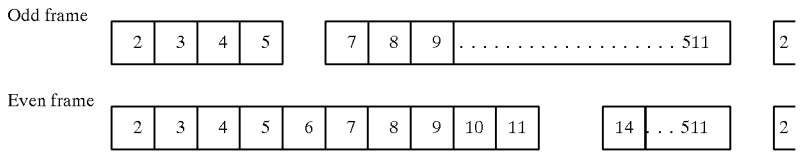

It can be seen that guardtimes of a couple of timeslots have been anticipated between the cessation of one satellite's transmission and the commencement of the other satellite transmission in order to allow for different propagation times from the two satellites to all locations. The question is how large these guardtimes must be, and how the resultant capacity waste can be minimized.

Figure 12:
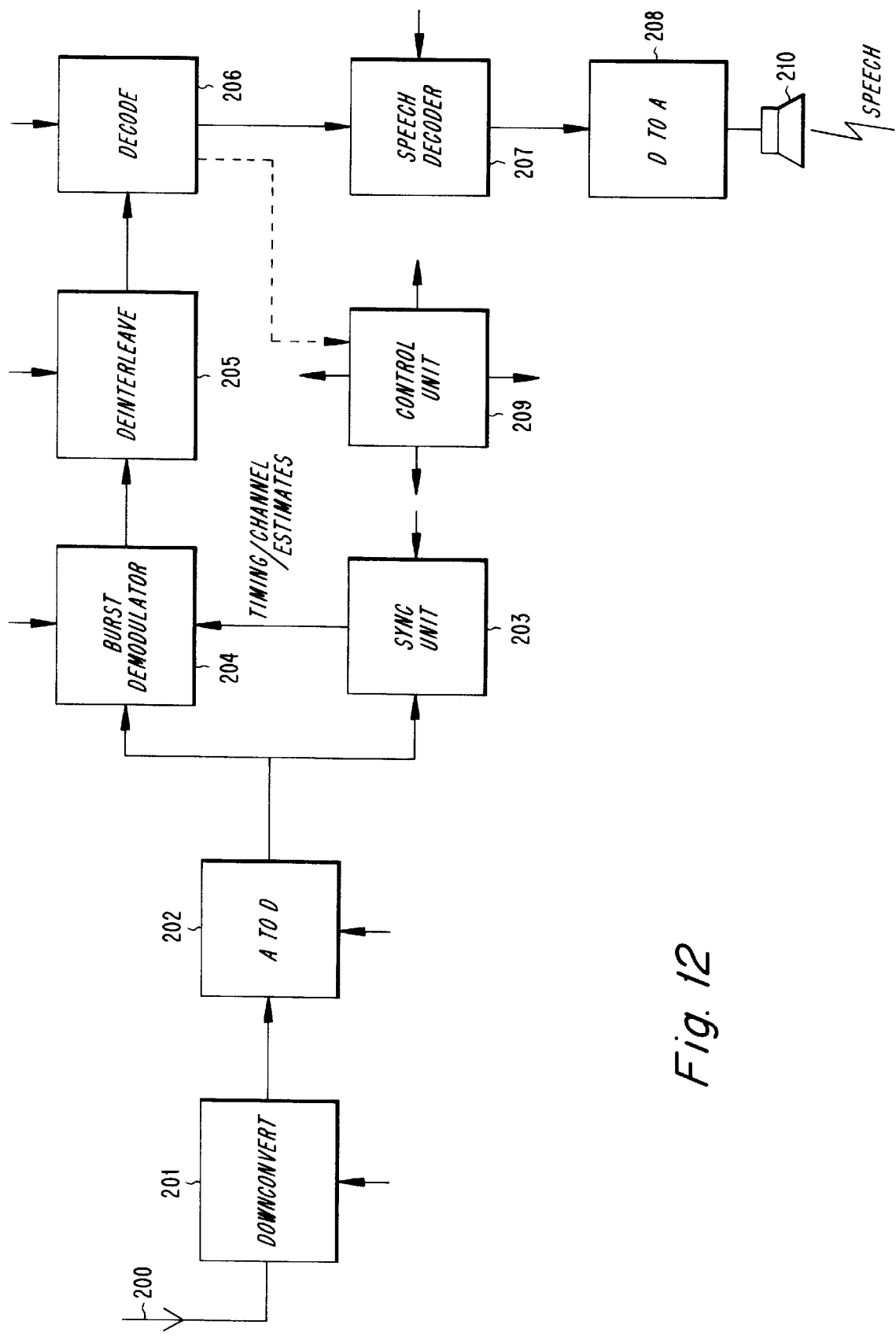
FIG. 12 illustrates a mobile terminal for receiving via a plurality of satellite.

A block diagram of a mobile terminal for receiving diversity transmissions is illustrated in FIG. 12. Signals are received from any visible satellite using an antenna 200. Received signals are downconverted to a suitable low frequency or baseband frequency using a downconvertor 201 which may be a conventional superhet or double superhet, or may be a homodyne receiver such as is described in U.S. Pat. No. 5,241,702, which is incorporated herein by reference. The patent discloses conversion of received signals directly from the radio frequency to a pair of I, Q baseband signals. Refinements are disclosed to eliminate the problem of DC offset or self interference caused by the local oscillator being on the frequency of reception. After practicing the refinements, digital representations of the received complex signal vector are produced in sampled form, compensated for DC offset. The improved homodyne concept comprises the A to D convertor 202. More conventional superhet or double superhet downconvertors can alternatively employ an A to D convertor 202 of the logpolar variety, as described in U.S. Pat. No. 5,048,059, which is incorporated herein by reference. Both methods produce a complex number stream representing the received signal. When a TDMA downlink transmission format is employed, a portion of the stream (a TDMA timeslot) carries information for a particular mobile. The number stream received during the allocated timeslot can be recorded in a buffer memory in the A to D convertor 202 from where it can be retrieved by either a sync unit 203 or a burst demodulator 204 for processing.

The sync unit 203 locates the position of the known symbol pattern (syncword) in the buffered sample stream by correlation to produce a timing control signal and a phase reference or channel estimate to the burst demodulator 204. The timing control signal describes to the demodulator the location in the buffer memory of samples corresponding to the syncword, which are used as a marker to locate unknown data symbols for decoding. This location does not change rapidly from burst to burst so long as the bursts are received from the same satellite. In this non-diversity case, the sync unit 203 only has to perform a relatively long term, slow update of the timing control signal to track any timing drift due to differences between the satellites system clock and the mobile terminal's local clock, or due to satellite motion. However when satellite diversity is in use such that alternate frames, for example, are transmitted from two satellites, then it is desirable for the sync unit 203 to determine and track separate timing estimates for odd and even frames. This avoids the need for the transmissions from the two satellites to be very accurately synchronized which would be technically more difficult. Thus, when control unit 209 informs the sync unit 203 that N-satellite diversity is in use, the sync unit 203 determines and maintains N separate timing statuses which are used according to the predetermined satellite transmission schedule.

A burst demodulator 204 processes the data received from whichever satellite and generates preferably soft decisions as previously mentioned in connection with the ground station processing. Soft decisions are delivered to a deinterleaver 205 which merges symbols plucked alternately from two successive bursts and from alternately to the right and to the left of the syncwords. This interleaving pattern is exemplary only and not meant to restrict the present invention, however it is desirable to merge data received via different satellites so that one bad path does not result in a block of successive bad symbols into an error correction decoder 206, but rather good and bad symbols alternate such that the decoder 206 can use good symbols to bridge over the bad symbols. In this way, the error correction decoder is more efficient in reducing errors caused by satellite path fading or being temporarily shadowed, for example by a passing truck.

After decoding, the decoded data blocks (speech frames) are passed to a speech decoder 207, which may incorporate other measures for bridging bad speech frames as indicated by an error detection check from the decoder 207. Finally, reconstructed waveform samples from speech decoder 207 are DtoA converted in the convertor 208 to drive a loudspeaker or telephone earpiece.

On occasions, the data decoded by the decoder 206 is a control data frame called the fast associated control channel. When this is detected, the decoded message is passed to the control unit 209 to take action such as switching diversity off or on, changing the number N of satellites in the diversity schedule, or changing frequency or timeslot used by the receiver or transmitter. Such a change to the operating channel is also known as a handover, handoff, internal handover or internal handoff.

For the reasons described in U.S. patent application Ser. No. 08/179,954, there is preferably an association between uplink channels and downlink channels even when the access methods used in the two directions are different. For example, a timeslot in a TDMA downlink can be associated with a frequency channel of an FDMA uplink to form a channel pair for duplex conversations. In the case considered here, both uplinks and downlinks are TDMA/FDMA hybrid access methods, wherein the former has few carrier frequencies with many timeslots per carrier frequency while the latter has many carrier frequencies with few timeslots per carrier frequency. For each downlink frequency/timeslot combination there is thus preferably an associated uplink frequency/timeslot combination. The 8 uplink timeslots on one uplink carrier disposed according to FIG. 1 map to 8 out of 128 timeslots spaced by 16 timeslots on one of five downlink carriers. The purpose of this mapping is to ensure the same transmit-receive timing in every portable station, and in particular to place uplink portable station transmissions between the reception by the portable station of its corresponding downlink timeslots and thus avoid simultaneous transmission and reception in the portable station. As a result, the need for a duplexer is avoided while still permitting a bidirectional information flow.

The 16 different groups of 8 downlink timeslots on a downlink carrier map to the 16×16 pattern of FIG. 2. Thus, the area using f1 on the uplink is served by timeslots 1,17,33,49,65,81,97, and 113 on the downlink. The area using f2 on the uplink is served by downlink timeslots 2,18,34,50, etc. and so-on. The spatial separation between usage of adjacent timeslots on the downlink is thus from the center of the f1 area to the center of the f2 area of FIG. 2, namely $$\sqrt{10}$$

small cell diameters, or $$1/\sqrt{64}$$

of the whole footprint size. The exception is that timeslot 16 is used in the cell with f16 as its uplink frequency, and timeslot 17 jumps back to the f1 cell again. However, in FIG. 4, frequency f16 has been removed from the cell pattern to be used as a random access channel, and correspondingly timeslot 16 is used as a paging channel on the downlink and is not part of the pattern. Timeslot 16 will be transmitted as a paging channel with more coding and at a power level 10 dB higher than traffic channel timeslots so as to be able to reach portable stations that are temporarily disadvantageously disposed. The energy for transmitting timeslot 16 at a normal or increased power level can be directed by the beam steering mechanism to any desired location in the pattern before taking up the pattern at timeslot 17 again.

Suppose that nominally the first half of the 128 timeslots are to be transmitted from satellite 1 and the second half from satellite 2. Downlink timeslots 1,17,33,49,65,81,97, and 113 illuminate the cell using uplink frequency 1 in FIG. 4. The first four of the timeslots are received from satellite 1 while the last four are received from satellite 2. The last timeslot transmitted by satellite 1 is paging slot number 64. Prior to that timeslot, timeslot 63 was directed to the square using uplink frequency 15. The reception of these 64 timeslots at squares 1 and 15, respectively is relatively delayed by a maximum amount when the satellite is on the western horizon (to the left of FIG. 4) and the delay is √17/64 or about one half of the footprint size. When the footprint is 1000 kM in diameter, the delay is about 1.7 mS. The relative delay is depicted below:

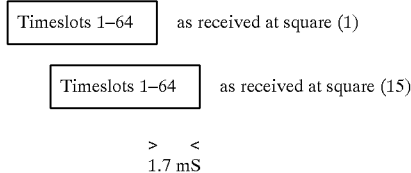

Now satellite 2 takes over, but it must be determined if satellite 2's transmissions are timed to dovetail with the end of satellite 1's transmissions in cell 1 or 15. If the former, and the second satellite is on the eastern horizon (to the right of FIG. 4) then its transmissions as received at square 15 will be relatively advanced by 1.7 mS compared to reception at square 1 as illustrated below:

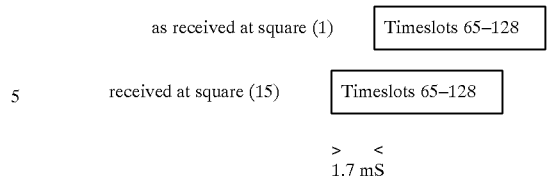

In square 15, there is therefore a 3.4 mS overlap of the transmission from the two satellites affecting timeslots 42 to 64 from satellite 1 and timeslots 65 to 87 from satellite 2. Of these, portable stations in square 15 would have used slots 47, 63 and 79. However, this is now questionable due to the time overlap. Thus, three out of 8 timeslots are lost in square 15, and none are lost in square 1 as the transmissions for square 1 are selected to be synchronized. Proportionally less loss is incurred for cells lying closer to cell 1 than cell 15. If instead the satellites had been timed to be synchronized for a square in the center of the area, the overlap in the border cells would reduce to 1.7 mS and approximately one to two timeslots out of 8 would be lost in some border cells.

Figure 6:
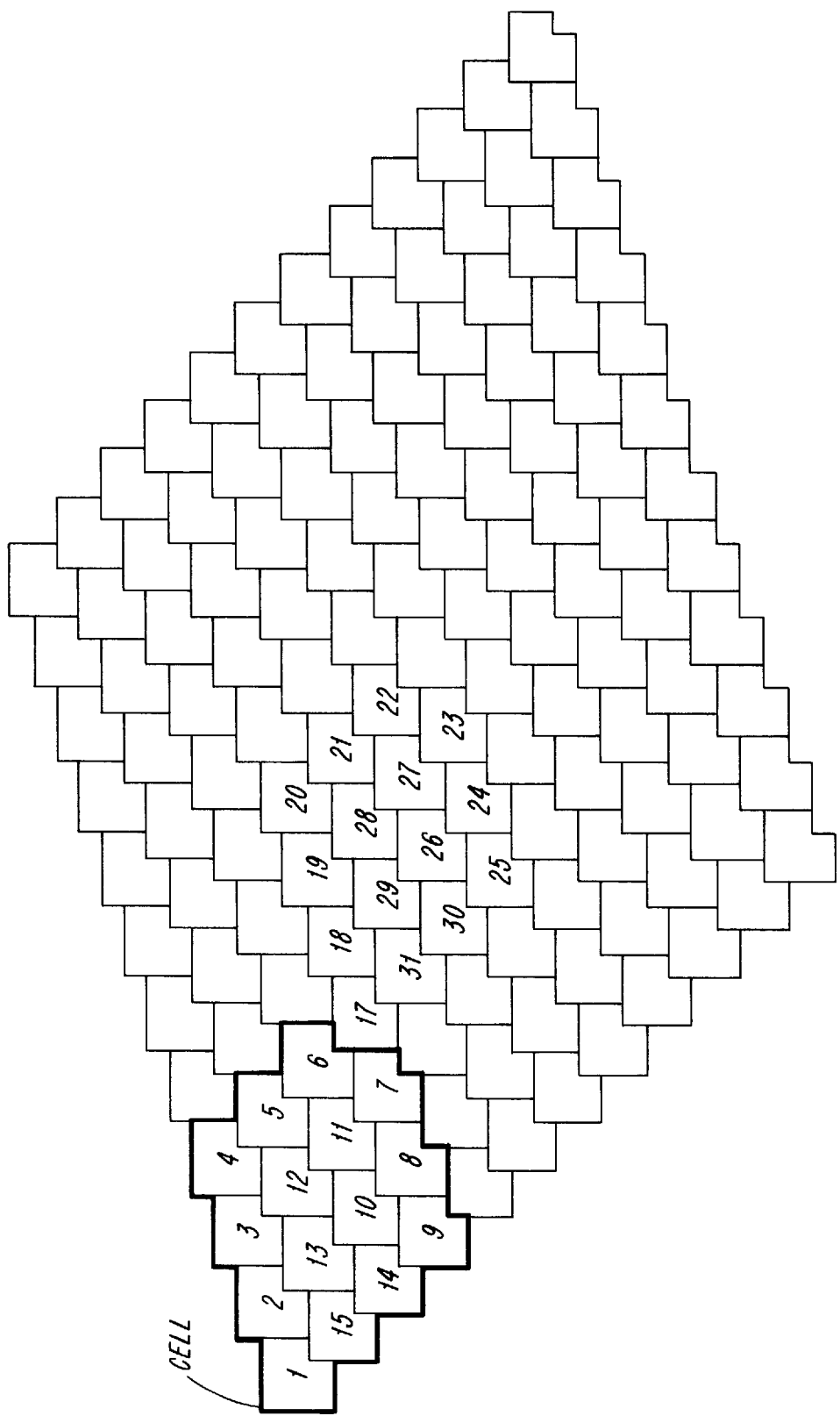
FIG. 6 illustrates a modified beam pattern wherein corresponding downlink timeslots are spatially adjacent according to one embodiment of the present invention.

To avoid this loss, the cell pattern might be rearranged as illustrated in FIG. 6 such that cells 15 and 1 are adjacent. It does not matter that cells 15 and 17 are then not adjacent as these are served by different downlink carriers. The relative delay if the satellites lie to the top left and bottom right of the Figure respectively is then reduced to $$\sqrt{8/640}$$

of the footprint size or about 370 uS. Since downlink timeslots are 156.25 uS long, overlap can be prevented by sacrificing 3 timeslots at the changeover between satellites, of which one can be a paging slot. Thus, a worst case capacity loss of 4 out of 120 traffic channels is incurred in order to provide 2-satellite diversity. Even this may be avoided by distributing timeslots along the hyperbola of constant relative time delay to the two satellites. A further consideration is then needed to derive the corresponding distribution of frequencies and timeslots for the uplink, which will be discussed below.

With the above method of dividing the downlink frame into three regions corresponding to timeslots and satellite stations that are served by satellite 1, satellites 1 and 2, and satellite 2, respectively, the uplink frame, being time-related to the downlink frame, is likewise divided into the same three regions. The uplink frame however has 8 timeslots on a carrier corresponding to 8 downlink timeslots spaced every 16 timeslots in the 128-timeslot downlink TDMA format. The uplink slot structure is illustrated in FIG. 7.

Figure 7:
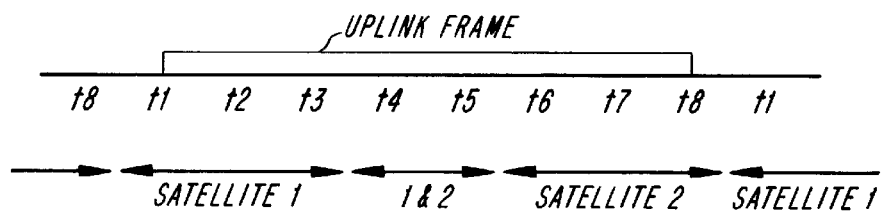
FIG. 7 illustrates an uplink slot structure for an 8-timeslot TDMA.

FIG. 7 simply divides the 20 mS frame into 8 slots without indicating how much of each slot is used for ramping and guardtime between slots. Guardtime between slots is not necessary for reception by a single satellite, since portable stations can apply an appropriate timing advance to their transmit times to ensure their signals reach the satellite in a non-overlapping fashion. This timing advance is established at call set-up by the satellite system giving the mobile a channel allocation that includes timing advance information. The timing advance is thereafter correctly maintained by small advance retard adjustments commanded by bits included in the downlink slot.

It is, however, not always possible to find a timing advance that will ensure that a mobile station's signals will arrive in sync at two different satellites. The only case where that can be exactly achieved is when mobile stations using uplink timeslots on the same uplink carrier are distributed along the hyperbola of constant delta-delay to the two satellites. This special case will be discussed later. Thus, in general, it is necessary to include guardtime between slots to prevent overlap at the receiving satellites.

Figure 8:
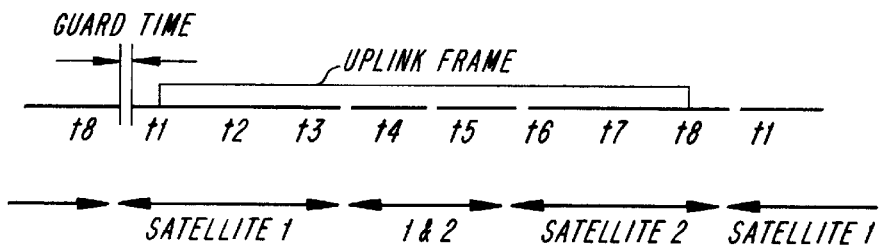
FIG. 8 illustrates the optimum timing for maximizing the guardtime between signals to be received at two satellites.

With reference to FIG. 7, however, overlap between timeslots 1, 2, and 3 is of no consequence at satellite 2, which is not used for receiving these signals. Likewise, overlap between slots 6, 7, and 8 at satellite 1 is not important to satellite 1. Therefore, mobiles using timeslots 1, 2, and 3 can be time-advanced to arrive in sync at satellite 1 without placing a guardtime between them and timeslots 6, 7, and 8 can be synchronized for arrival at satellite 2. This permits any available guard time to be used for separating timeslots 3 from 4, 4 from 5, 5 from 6 and 8 from 1 as shown in FIG. 8.

Figure 9:
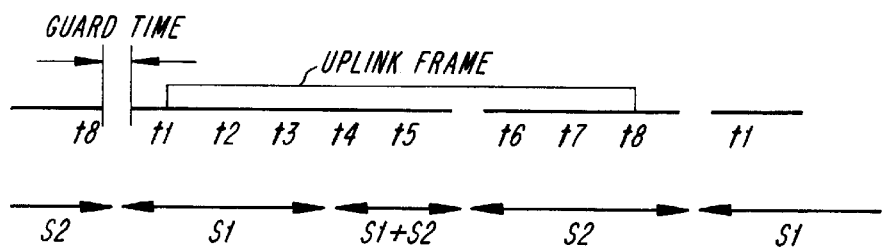
FIG. 9 illustrates the guardtime needed for satellites on the eastern and western horizons.

With reference to the timeslot distribution on the ground shown in FIG. 1, namely:

| t5 | t6 | t7 |
|----|----|----|
| t4 | t1 | t8 |
| t3 | t2 |    | the timing can be further optimized, for example, when the two satellites lie respectively to the east and west of this distribution. Then, since timeslots 3, 4, and 5 are used at positions approximately equidistant from both satellites no guard time is needed between timeslots 3, 4, and 5. The only collisions that have to be protected with this satellite constellation are between timeslots 5 and 6, and 8 and 1. Therefore, available guardtime can be further concentrated to these two positions in the format as shown in FIG. 9.

Thus, guardtime is used at only two of the eight intersiot positions in the frame, increasing the allowed displacement of mobiles employing satellite diversity reception from their nominal positions.

Figure 10:
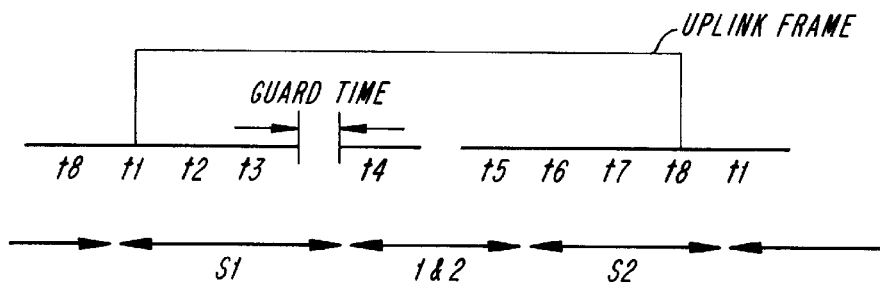
FIG. 10 illustrates the timing required for a North-South satellite constellation.

An equivalent case arises for satellites lying on the northerly and southerly horizons. Then collisions between timeslots 1 and 8, and 5 and 6 do not occur as those pairs are equidistant from both satellites. Collisions between timeslots 7 and 8 at satellite 1 are not important to satellite 1. Collisions between timeslots 6 and 7 and between timeslots 2 and 3 do not occur and in any case are not important because those timeslots are only intended to be timeslots received by one satellite. In addition, collisions between timeslots 1 and 2 at satellite 2 are also not important to satellite 2. The optimum timing for the north-south satellite constellation is illustrated in FIG. 10.

Thus, by intelligently commanding timing advance of mobile transmissions from the satellite system according to whether a mobile is intended to be received at only one or several satellites, the guardtime needed to be included in a TDMA uplink format to avoid timing collisions can be minimized or at least employed to best effect in permitting mobiles to lie anywhere over a larger area.

The operation of the timing controller according to the present invention is best understood in the context of the steady state in which a large number of ongoing conversations are taking place in each satellite beam and making optimum use of all visible satellites in each area.

With an average length of telephone call of 3 minutes and a load of 10000 Erlangs, calls are continuously being terminated at the rate of 55 per second, freeing timeslot/frequency combinations in various beams. Likewise 55 calls are being initiated per second, requiring frequency and timeslot allocations to be made. In the case where two satellites are visible, the present invention comprises determining whether satellite A,B or both shall serve a new call. The allocation of the best satellite or satellite combination is the first step. Thereafter, an uplink timeslot is allocated with regard to avoiding timeslot overlap with other ongoing conversations using neighboring timeslots on the same uplink frequency. This is the function of the inventive timing controller.

The timing controller analyzes the suitability of each free timeslot and frequency combination. The criterion used to produce the list is that the same frequency and timeslot combination must not already be in use within 0.75 beam diameters of the mobile position, where the beam diameter is defined, for example, as the distance between −4.5 dB down points on the beam edge with respect to the beam peak. This criterion is employed to guarantee that the level of co-channel interference from other users of the same channel in adjacent beams will be acceptably low, and is exemplary and not meant to imply restriction of the present invention. The exact criteria for avoiding co-channel interference from other beams will depend upon the shape, orientation and sidelobe pattern of the antenna beams.

The information on beam shapes and absolute coordinates of beam center are known through the satellite tracking and beamforming system and are combined with an estimate of the position of the mobile requesting a call to select channels meeting the C/I criteria. The information on the position of the mobile to which a new call shall be connected may be provided in the form of correlation coefficients measured for each antenna element for the mobile signal received on the random access channel.

The channel controller analyzes channels in the list in one of two ways:
1. single satellite operation; or
2. two-satellite diversity operation, according to whether operation through satellite A,B or both has been determined to be preferred. The first method is used if satellite A or B alone is selected to serve the call.

The first uplink carrier which has a free timeslot in the list is first analyzed. With 8 timeslots per carrier which may each be in use with satellite A, B, both, or not in use, the carrier status can in principle be in one of 65536 sates. Denoting the states by A,B,U for unused and D for diversity, typical states may be described by

AAUDDUBB OR DAAADBBB OR AAADBBBD

Some states do not exist, for example, ABADDBAB, because the TDMA frame will be split either with A's on the right and B's on the left with D's in the middle, or vice versa, but not with interleaved A's and B's. It is also possible to employ an alternative diversity format on both the uplink and the downlink in which frames are considered divided into diversity operation on the left and right and single satellite operation in the middle, e.g. DDUAAUDD or DDBBBBUD. In that case, however, a single satellite operation region only for satellite A or for satellite B is provided, and this is not so useful as it is likely that some mobiles will prefer satellite A alone and others will prefer satellite B alone, even in a region which both satellites illuminate.

It is also less likely that states such as AUADDBUB exist, as the timing controller would already have sought to move the second A away from the D region to avoid timing clashes between a mobile that is synchronized to one satellite A and a mobile that is attempting to synchronize to both (D). Thus, DAAADBBB is the preferred arrangement, in which any of the A, B, or D slots could alternatively be denoted by U if unused. With regard to the repetitive nature of the frame, the sequence is actually DAAADBBBDAAADBBBDAAADBBB . . . etc.

It may also be undesirable to have a sequence such as BA next to each other, as in attempting to synchronize with B it is possible the B-mobile's signal arrives late at A, clashing with the A-mobile's signal in the following timeslot. If, however, the A satellite is nearer the B-mobile than the B satellite, the B-mobile's signal will arrive at A earlier and will not be delayed into the A-mobiles timeslot. Unfortunately it is often more likely, albeit not always certain, that a mobile will prefer to operate via the satellite to which it is nearest and not to the satellite further away. Thus, the B-mobile's transmissions should be advanced slightly in time to avoid overlapping the A mobile's transmissions at the beginning of the next frame.

The A-mobile transmissions can likewise be delayed slightly for the same reason, so that both share equally the task of achieving the timing constraints. That will, however, move the AA's towards the DD's, closing up the unused timeslot in between. Exceptions can exist, for example, when an indoor mobile attempts to communicate with the satellite visible through a window at low elevation rather than to a satellite overhead and screened by the roof.

As previously described, there is a limited amount of guard time available in the frame to resolve timing clashes, and the timing controller's task is to determine how to use this effectively by placing it where it is most needed. The locations of the guardtimes in a fully loaded frame are indicated by the values t1, t2, t3 in the following frame structure, which is used as an example rather than implying a preferred arrangement:

t3 A1 A2 A3 t1 D1 D2 t2 B1 B2 B3 t3 A1 A2 A3 t1 D1 D2 t2 B1 B2 B3 t3. . .

Guard time is not necessary between mobiles such as A1, A2, A3 that are only desired to be received by one satellite (A); such mobiles have their transmissions timed to be received in abutting timeslots at satellite A and it is of no consequence if reception at satellite B would be overlapping. In fact, overlapped reception at satellite B of mobiles A1,A2,A3 is desirable, as this shortens the percentage of the TDMA frame that they occupy at satellite B and thus allows greater guard times (t1, t3) to ensure non-overlap with mobiles B3 or D1 at satellite B. Sophisticated modern signal processing techniques such as joint demodulation can be implemented at the ground station to successfully decode even partially overlapping timeslots, and such processes can be assisted by judicious placement of known sync symbols in the bursts. The technique of demodulation of the strongest of the overlapping signals first followed by its substraction before demodulation of the underlying, weaker signal can also be employed,as described in U.S. Pat. No. 5,151,919 which is incorporated herein by reference. Partial overlap of timeslots need not, therefore, be catastrophic, although the purpose of the timing controller is to avoid this.

The inventive timing controller, therefore, seeks to pack together the mobiles such as A1, A2, A3 that shall be received principally only by satellite A in such a way that they occupy the minimum time without overlap at satellite A and the minimum timespan irrespective of overlap at satellite B. This is carried out principally at call set-up when the controller evaluates the available empty timeslots for connecting a new call, and this may entail re-shuffling of already allocated timeslots if advantageous. The time-packing is maintained thereafter by the dynamic time alignment mechanism whereby, during a call, a mobile receives commands from the satellite network to either advance or retard its transmit timing relative to receive timing.

Consider the timing controller's evaluation of an uplink frequency with the current timeslot allocations:

t1 A1 A2 U D1 D2 t2 B1 B2 B3 t1 A1 A2 U D1 D2 . . .

The timing controller will already have packed together A1 and A2 such that the guard time t1 between A1 and B3 is just adequate to ensure that A1 does not overlap with B3 at satellite B, thus maximizing the width of the unused slot U. At satellite B, A1 and A2 will overlap and thus occupy less than two slots. If they did not, the controller would previously or will now reverse the allocations of mobiles to slots A1 and A2 to achieve this. These operations are performed by the controller using determination of the difference in propagation times for a mobile signal to satellite A and B, respectively.

For example, if the propagation time for mobile signal A1 to satellite A is 35 mS and the propagation time to satellite B is 38 mS, there is a delta delay of +3 mS to satellite B. Suppose now that the propagation time from A2 to satellite A is 35.1 mS and from A2 to satellite B is 38.2 mS; the delta delay for mobile A2 is then 3.1 mS. Then on the same timescale, the signals received at the satellites will be:

```
         t1      A1      A2      U       D1      D2      t2      B1      B2      B3      t1...
At A:   <->  <--->   <--->   <--->   <-..->  <-..->  <-->   <--->   <--->   <--->   <->

A1      A2      U       D1      D2              B1      B2      B3    ...
At B:          <--->   <--->   <-->   <-..->  <-..->          <--->   <--->   <--->
               <->             <->
               3mS             0.1mS
```

It can be seen that A1+A2 occupy a greater proportion of the frame than two timeslots at satellite B, due to the opening up of an 0.1 mS gap between them. This closes up the unused slot U at B so that the third signal A3 could not be accommodated as seen from satellite B without overlapping either A2 or D1. Overlapping D1 is to be avoided as the D(iversity) mobiles shall be correctly received at both satellites. An overlap of A-mobile signals at B however is of no consequence as they are only intended to be received at A.

The controller thus seeks to interchange the allocation of A1 and A2 so that the mobile with the higher delta-delay is allocated the earlier slot, with the result:

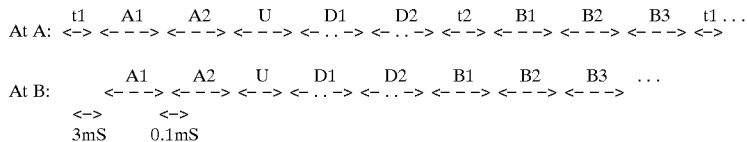

-continued

```
         A2    A1    U     D1    D2    B1    B2    B3   ...
At B:   <---!--->  <-->  <-...-> <-...-> <--->  <--->  <--->
        <->         <->
        3.1mS       3mS
``` wherein ! indicates an 0.1 mS overlap between the A2 and A1 bursts. In this way, the unused slot U at B is opened up by 0.1 mS instead of being closed up by 0.1 mS.

Suppose the propagation delays for a third mobile signal A3 are 34.9 mS to satellite A and 38.3 mS to satellite B, with a delta of 3.4 mS. If A3 is placed in the unused timeslot U and time-controlled to abut with A2 A1 at satellite A; then there will be a gap of 0.4 mS between A1 and A3 at B. That is:

```
        t1   A2    A1    A3    D1    D2    t2    B1    B2    B3   t1 ...
At A:  <-> <---> <---> <---> <-...-> <-...-> <-> <---> <---> <---> <->

A2    A1    A3    D1    D2    B1    B2    B3   ...
At B:       <---!--->  <---!-...-> <-...-> <--->  <--->  <--->
            <->        <-->
            3.1mS      3.4mS
``` where ! now indicates a possible clash between A3 and D1 at B.

The more preferred situation is thus for the order A3 A2 A1 as follows:

```
        t1   A3    A2    A1    D1    D2    t2    B1    B2    B3   t1 ...
At A:  <-> <---> <---> <---> <-...-> <-...-> <-> <---!---!---> <->

A3    A2    A1    D1    D2    B1    B2    B3   ...
At B:       <---!--!--->  <-...-> <-...-> <--->  <--->  <--->
            <-->        <->
            3.4mS       3mS
``` wherein ! indicates overlap between A3,A2 and A1 slots at satellite B, and it has also been anticipated that the timing controller would analogously arranged the B-mobiles to abut at satellite B and to overlap at satellite A in order to open up space for the guard times t1 and t2.

Thus, the mobiles A1,A2,A3 whose signals are not required to be received at satellite B are deliberately overlapped at satellite B so as to occupy the least amount of time in the TDMA frame. Similarly, the mobiles B1,B2,B3 are allocated to timeslots so that their bursts overlap at satellite A but not at satellite B.

It may be seen that the systematic strategy that the inventive timing controller employs to achieve this is to allocate mobiles to timeslots in descending order of delta propagation delay to the non-preferred satellite compared to the propagation delay to the preferred satellite. That is, A-mobiles with the greatest propagation delay increase to the satellite B over that to the satellite A are placed first in the A portion of the frame.

Similarly, mobiles for sole reception by satellite B are ordered in the B portion of the frame in descending order of delta propagation time increase to A over that to B. Since the mobiles in a completely filled A portion of the frame will then occupy less than the sum of their timeslot widths at B, this provides margin for guard time between the A and D parts of the frame at B and between the B portion of the frame and the following A portion. Likewise, the B mobiles in a fully filled B-section of the frame will be received at A occupying a time less than the sum of their timeslots, so allowing a margin for guard time between the B and D parts of the frame at A and between the B and A parts of the frame at A.

Rather than reshuffling existing allocation of conversations to timeslots to accommodate a new call in the optimum manner described above, the timing controller can first evaluate whether the new mobile fits into available slots in the correct descending delta-time order without shuffling. Consequently each uplink carrier frequency in the allowed list is tested to see if any empty slot meets the delta-time criterion. If not, the existing 'A' calls on some carrier are issued either with slot change commands or timing advance control signals or both in order to shuffle the timeslot allocations to make an optimum place available for the new call. The carrier which is chosen for the new call is that with the lowest co-channel interference from other cells using the same carrier. Alternatively, an adaptive channel allocation scheme based on dollar-cost functions can be used, as described in Swedish Patent Application No. 9301695-4, corresponding to U.S. patent application Ser. No. 08/245,031, now U.S. Pat. No. 5,530,917 in order to make a weighted decision based on both co-channel interference and the amount of timing reshuffling needed. This Swedish Patent is hereby incorporated by reference in its entirety.

To determine the co-channel interference in an empty timeslot on a given carrier, the channel allocation algorithm can instruct the ground-based beamforming computer to process signals received from the satellite's antenna elements (via the feeder downlink) so as to create a receive beam in the direction of the mobile in question.

The interference level in the beam is then computed. In this context, "co-channel signals" means signals that are allocated the same uplink frequency and timeslot for use at different physical locations.

Ideally, the increase in co-channel interference caused to other signals by the new signal should also be accounted for in determining the optimum channel. A systematic procedure for estimating the effect of adding the new signal is disclosed in U.S. patent application Ser. No. 08/179,953, now U.S. Pat. No. 5,619,503 and is incorporated herein by reference. This computation may be performed without processing real-time signals received from the satellite. The calculation may be performed "off-line" in any suitable computer using the antenna array coefficients of ongoing conversations using the same frequencies in different locations plus coefficients determined for the new mobile during the initial call set-up procedure on an initial access channel. Since this procedure specifically accounts for the proximity or otherwise in beam-space of co-channel signals, the original criterion for selecting a channel shortlist, namely that the same channel should not be in use within 0.75 beam diameters, is not strictly necessary, except that such a simple initial screening process can reduce the number of the more complex matrix manipulations that have to be computed using the procedure described in the aforementioned patent application. The matrix manipulations give theoretical estimates of the signal to noise plus interference ratios that will be achieved for all co-channel signals in the system after re-optimizing the signal processing (beamforming) coefficients upon addition of the new signal. The worst of these is taken as the "quality" of the tentative channel assignment, and candidate assignments are ranked in order to this "worst" value, or the worst value translated to a notional dollar-cost for use with the inventive adaptive channel allocation scheme disclosed in the aforementioned Swedish patent application. One advantage of the above procedure is that it can determine the potential level of co-channel interference and noise, even when some of the cochannel signals are temporarily silent, so long as a set of beamforming coefficients for the silent signals has been memorized. The disadvantage of the alternative of processing real-time signals is that it is not desirable to vary the coefficients of ongoing conversations to test how much SNR loss is entailed in accommodating the new signal, and furthermore, due to some of the co-channel signals being temporarily silent due to lack of voice activity in one direction, (i.e. Discontinuous Transmission (DTX) is employed to conserve battery power), the real-time situation is only a momentary one that can change with voice activity. The off-line channel evaluation procedure however can be done assuming all co-channel signals are active, using only their array coefficients, and their actual signals are not needed.

The above description deals with the allocation of channels to mobiles that operate through a single satellite in such a way that they will not interfere with each other or with mobiles operating through another satellite. The case of assigning channels to a mobile desiring to be received by both satellites in order to obtain a diversity gain will now be described.

It can be assumed that the timing controller already will have controlled the timing of mobiles to be received only at satellite A such that their bursts abut at satellite A and overlap at satellite B, thus occupying less of the frame period at satellite B than the sum of their slot lengths. For example, if there are three signals to be received at satellite A only (A1, A2 and A3) and the differences in their delta propagation times are denoted by d12 and d23 then they will occupy 3T −d12−d23 at satellite B, where T is the nominal duration of one uplink TDMA timeslot.

Likewise it may be assumed that the timing controller will have controlled the timing of mobiles to be received only at satellite B such that their bursts are received abutted at satellite B but overlapping at satellite A. If the differences in their delta propagation times (assuming three mobiles B1,B2,B3) are designated by d12' and d23', then the three B-mobiles will occupy a time at satellite A of 3T −d12'−d23'.

The preferred frame structure for facilitating diversity operation is actually DAAADBBB and this is expanded below to show the timing as received at satellites A and B in more detail:

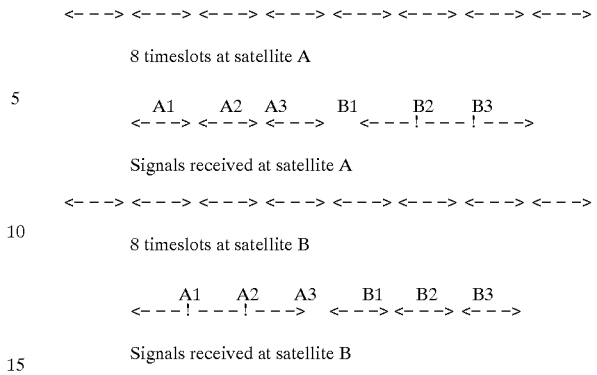

The above shows that A-mobile signals are received at satellite A with time overlap indicated by ! such that they occupy less than three timeslots. Likewise, B-signals overlap at satellite A occupies less than three timeslots. The diagram above however, indicates that mobile A3 is received earlier at satellite B than at satellite A, indicating that satellite B is the nearer satellite to A3.

While it can occur due to look-angle obstruction that a more distant, lower elevation signal will be preferred, it is more likely that A-signal will exhibit a mean delay at satellite B and vice versa, leading to the diagram:

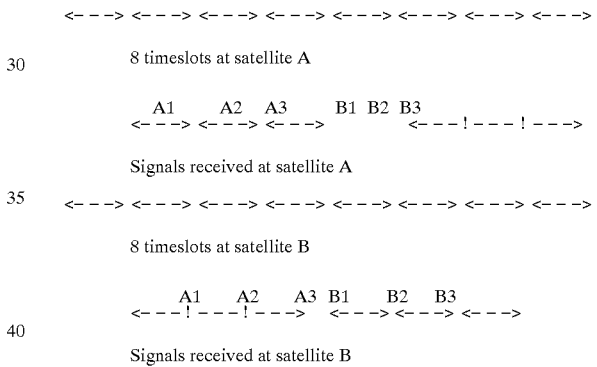

The timing controller thus strives to find a mobile to be A3 that is received at the satellite B no later than one timeslot earlier than B1 and vice versa, that B3 is received no later than one timeslot earlier than A1 is received at A. This ensures that a gap of at least one timeslot width exists between B3 and A1 at the satellite A, the same gap being wider at satellite B, while at least one timeslot width is free at satellite B between A3 and B1, the equivalent gap at satellite B being wider. The gaps are now available to allocate to suitable diversity mobiles. Note that the absolute delay differences to satellites A and B are irrelevant, as we have the freedom to shift the entire timing reference on a particular frequency in a particular beam without interfering with users on the same frequency in other beams. We can also assume that, on average, as many mobiles that wish to be received by both satellites will be received relatively late at satellite B compared to satellite A and the other way around, having taken out the absolute delay difference from two satellites to the center of the area in which the given frequency is available to be used. These two groups of mobiles are respectively suitable for allocating to gaps such as the B3-A1 gap at satellite A, the equivalent at satellite B being wider and later, or to the A3-B1 gap at satellite B which is wider and shifted later at satellite A. A diversity mobile allocated to the B3-A1 gap is commanded to time align itself with other signals (i.e., the B mobiles) received at satellite B, while a diversity mobile allocated to the A3-B1 gap is commanded to time-align itself with the other signals (i.e., the A signals) received at satellite A. These time alignment commands are generated by the satellite/ground station system after observing the relative timing of the diversity station system after observing the relative timing of the diversity mobiles' signals, and the advance/retard commands are sent to the diversity mobiles as part of the Slow Associated Control Channel (SACCH) information multiplexed with speech or traffic data.

It has thus been described above how an intelligent timing controller can advantageously allocate mobiles to frequencies and timeslots according as they are required to be received only by a first satellite, a second satellite, or both, such that the need for wasteful guardtimes in the TDMA format is avoided. Moreover, the allocation takes account of cochannel interference due to finite sidelobe levels from other signals using the same frequency and timeslot combinations in other beams.

It will be appreciated that an invention that permits the same mobile signal to be relayed by more than one satellite to a ground station represents a gain on the communications link budget of at least 3 dB, as twice the signal power is captured by two satellites and the ground station can perform diversity combining to effectively add the two powers together. In the case of fading or shadowing of the mobile station's signal to one or other satellite, the gain of diversity satellite reception is worth more than 3 dB relative to what the performance otherwise would have been with allowance for such fading or shadowing.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method of communications with a plurality of ground terminals using a plurality of satellites transmitting time-division multiplexed signals, comprising the steps of:

transmitting from a first satellite to a first group of ground terminals using a first number of timeslots in a TDM frame period;

transmitting from said first satellite and a second satellite in alternate TDM frames to a second group of ground terminals using a second number of timeslots in said TDM frame period; and transmitting from said second satellite to a third group of ground terminals using a third number of timeslots in said TDM frame period.

2. The method according to claim 1, further comprising:

at least one ground terminal adapted to receive signals alternately in a TDM timeslot transmitted by said first satellite and a timeslot transmitted by said second satellite.

3. The method of claim 1, wherein said satellites employ electronically steered directive transmission.

4. The method of claim 3, said electronically steered directive transmission is performed using a phased array antenna.

5. The method of claim 3, wherein said directive transmissions are steered on a per-timeslot basis.

6. Ground terminal means adapted for communicating via a plurality of orbiting satellites comprising:

receiver means for receiving a signal transmitted in a TDM timeslot from a satellite and amplifying, filtering and converting it into numerical form for processing;

timing means for adapting said receiver means to receive said TDM timeslot cyclically in different frames from each of said plurality of satellites according to a predetermined pattern; and numerical processing means for processing said converted signals received from different satellites in such a way as to reduce the effects of signal fading.

7. The ground terminal according to claim 6, wherein said ground terminal receives signals from two satellites alternately.

8. the ground terminal according to claim 6, wherein said numerical processing means includes deinterleaving means and error-correction decoding means.

9. Timing controller means for controlling the transmit times of a plurality of satellite ground terminals in dependence on whether said transmissions are intended to be relayed by a first orbiting satellite, a second orbiting satellite or more than one orbiting satellite to avoid time overlap between transmissions from the plurality of ground terminals to the first and second orbiting satellites, comprising:

means for dividing channels into a plurality of timeslot groups, wherein a first group of timeslots are for ground terminals communicating with the first satellite, a third group of timeslots are for ground terminals communicating with the second satellite, and a second group of timeslots are for ground terminals communicating with the first and second satellites;

means for determining propagation delay of signals from ground terminals to said first and second satellites;

means for assigning ground terminals from said first group that produce the greatest propagation delay increase to the second satellite compared to that of the first satellite to timeslots at the front of said first group of timeslots; and means for assigning ground terminals from said third group that produce the greatest propagation delay increases to the first satellite compared to that of the second satellite to timeslots at the front of said third group of timeslots.

10. The timing controller according to claim 9, wherein said control is effected by transmitting timing adjustment commands to said ground terminals using one or more of said orbiting satellites as a relay for said commands.

11. A timing controller according to claim 9, further including:

comparison means for comparing reception quality of a signal relayed by at least said first and said second satellite and making a decision whether said signal relayed by said first satellite or said second satellite shall be processed or whether signals relayed by said first and second satellites shall be jointly processed; and determining means depending on said decision for determining a preferred value for said transmit timing of at least one of said ground terminals.

12. The timing controller of claim 11, further comprising:

means to transmit a command to said at least one ground terminal to adapt it to said preferred timing.

13. The timing controller of claim 12, wherein said command transmission means transmits commands to adapt the timing of several of said ground terminals at approximately the same time.

14. The timing controller of claim 13, wherein transmission of said commands causes said several ground terminals to adapt their transmit timings including an interchange of timeslots one with another.

15. The timing controller of claim 11, wherein said determining means determines said preferred timing so as to avoid time overlap at more than one satellite between two signals transmitted by two of said ground terminals and intended to be relayed by said more than one satellites.

16. A method for improving radio communication service quality between a radio communications network and subscriber stations using at least two relay stations operating to provide path diversity, comprising the steps of:

transmitting a signal burst containing a first part of an information signal using a communications channel available to a first of said at least two relay stations and transmitting a signal burst containing a second, different part of said information signal using a channel available to a second of said relay stations; and while said first relay station is transmitting a signal burst to a given subscriber station, using said available channel on said second relay station to transmit a burst to a different subscriber station and vice-versa.

17. A method according to claim 16, wherein said available communications channels are each characterized by a time slot in a repetitive TDMA frame period combined with a radio frequency channel allocation.

18. A method according to claim 16, wherein said relay stations are orbiting satellites.

19. A subscriber terminal for providing voice or data communications with a radio communications network employing path diversity, comprising:

receiving means for receiving signal bursts alternately from a first transmitting station on a first communications channel and a second transmitting station on a second communications channel; and processing means for jointly processing information received in successive bursts comprising information transmitted by said first station and different information transmitted by said second station in order to provide an improvement in signal quality by path diversity.

20. A subscriber terminal according to claim 19, wherein said first and second communications channels are defined by designating a timeslot in a repetitive TDMA frame period and a first and second radio frequency channel.

21. A subscriber terminal according to claim 20, further comprising agile channel selection means capable of adapting said terminal for operation alternately on said first and second communication channels for reception of alternate TDMA bursts.

22. A subscriber terminal according to claim 21, wherein said agile channel selection means includes a frequency hopping synthesizer.

23. A subscriber terminal according to claim 19, wherein said path diversity operation can be deactivated when not needed and said processing means then processes information received from a single transmitting station.

24. A subscriber terminal according to claim 23, wherein path diversity operation is activated when said subscriber terminal can receive at least two of the transmitting stations and deactivated when said subscriber terminal can receive only one of the transmitting stations.

25. A subscriber station according to claim 23, wherein diversity operation is selected when said terminal is located in a border region between two transmitting stations and deactivated otherwise, thereby effecting soft handover when transitioning between regions served by different stations.

26. A subscriber terminal according to claim 19, wherein said transmitting stations include ground-based cellular base stations, orbiting satellites or airborne relay stations.

27. Timing controller for controlling the transmit times of a plurality of satellite ground terminals in dependence on whether said transmissions are intended to be relayed by a first orbiting satellite, a second orbiting satellite or more than one orbiting satellite to avoid time overlap between transmissions from the plurality of ground terminals to the first and second orbiting satellites, comprising:

means for distributing timeslots to ground terminals along lines of constant delta-range to said first and second satellites; and means for distributing frequencies to ground terminals-lying along lines of constant delta-Doppler.

* * * * *